United States Patent
Felden

[15] 3,664,503
[45] May 23, 1972

[54] ELASTIC SIEVE BOTTOM

[72] Inventor: Alois Felden, Munich, Germany

[73] Assignee: Stahlgruber Otto Gruber & Co., Munich, Germany

[22] Filed: Aug. 22, 1969

[21] Appl. No.: 852,215

[30] Foreign Application Priority Data

Aug. 22, 1968 Germany ............ P 17 58 860.2

[52] U.S. Cl. .................. 209/397, 29/401, 161/112
[51] Int. Cl. .............................................. B07b 1/46
[58] Field of Search ............ 209/392, 397, 399–401, 209/403, 405, 408; 55/524; 210/499; 161/95, 109, 112; 29/401; 248/74

[56] References Cited

UNITED STATES PATENTS

| 3,390,771 | 7/1968 | Wehner ........................ 209/408 X |
| 3,286,963 | 11/1966 | Bergman ........................ 284/74 |
| 3,324,853 | 6/1967 | Czorny et al. .................. 24/257 X |
| 3,465,420 | 9/1969 | Webb et al. ................... 29/401 X |

Primary Examiner—Frank W. Lutter
Assistant Examiner—William Cuchlinski, Jr.
Attorney—Connolly and Hutz

[57] ABSTRACT

An elastic sieve bottom includes abutting elastic sieve bottom sections with spaced sieve apertures therethrough, and a reinforcing mesh received in grooves in portions of the sieve bottom between the apertures.

6 Claims, 3 Drawing Figures

PATENTED MAY 23 1972   3,664,503

ELASTIC SIEVE BOTTOM

BACKGROUND OF INVENTION

This invention relates to the manufacture of sieve bottoms consisting of an elastic material — e.g., rubber or plastics. The latter are advantageously used in sieve techniques, more particularly in the technique of processing coarsely fragmented stock which may possibly strike the sieve bottom from a high fall height, because the elasticity peculair to rubber deadens the impact and reduces the wear in the case of coarsely fragmented stock which may be sharp-edged —e.g., stones or coal — thereby improving the durability of the sieve bottom.

Sieve bottoms of this type are generally manufactured of solid material — e.g., rubber—while in many cases wire or wire rope inlays are provided in the bars adjoining the sieve apertures, forming a reinforcement after the fashion of a mesh fabric having high tensile strength.

It is also known to construct an elastic sieve of this type of profile tubular sections and profile strings or profile tubes, in that tubular sections in the one direction and profile strings or profile tubes in the other direction, generally at right angles to the first direction, are aligned alternately on tension rods.

It is further known to thread lamellar, T-shaped, L-shaped or cone-shaped elements made of solid material, which possibly exhibit sieve apertures, onto wire ropes in such a way that they partly mutually abut with their end faces and partly delimit sieve apertures dictated by their conformation and produced by the threading.

In this case again, however, the manufacture is fairly complicated because it is not always a simple matter to align the solid material sections onto wire ropes. Above all, however, it is found in practice that sieve bottoms are generally not uniformly stressed and are subject to wear, and then if the above-described mode of construction of elastic sieve has been adapted it is a complicated matter to repair specific parts by exchanging the solid material sections. For in this case it is necessary, if the part particularly highly stressed and requiring repair is remote from the edge — e.g., in the center of the sieve — first of all to remove all those solid material sections which are aligned or strung as far as that point, then to replace the damaged ones and then to restring the undamaged ones.

SUMMARY OF INVENTION

An object of this invention is to provide a wire or rope reinforced sieve bottom consisting of elastic material — e.g., rubber or plastics, which is simple to manufacture and easy to repair.

In accordance with this invention a wire or wire rope reinforcing mesh is fitted with prefabricated plates containing a large number of sieve apertures or groups of sieve apertures, which can be placed from above — i.e., from the side confronting the impact of the stock — and can be attached to the reinforcing mesh by light pressure.

The invention accordingly relates to an elastic sieve bottom comprising rubber or plastics plates having sieve apertures and a reinforcing mesh consisting of longitudinal and transverse wires or ropes, which is characterized by sieve bottom sections forming the effective sieve bottom surface and mutually abutting by their narrow faces, which have sieve apertures at a mutual interval and accommodate the longitudinal and transverse wires or ropes of the reinforcing mesh in grooves in bars remaining between the apertures.

THE DRAWINGS

The drawing shows on a reduced scale an exemplary embodiment of the invention, with reference to which it is described hereinbelow. In the drawing.

DETAILED DESCRIPTION

Figure 1:
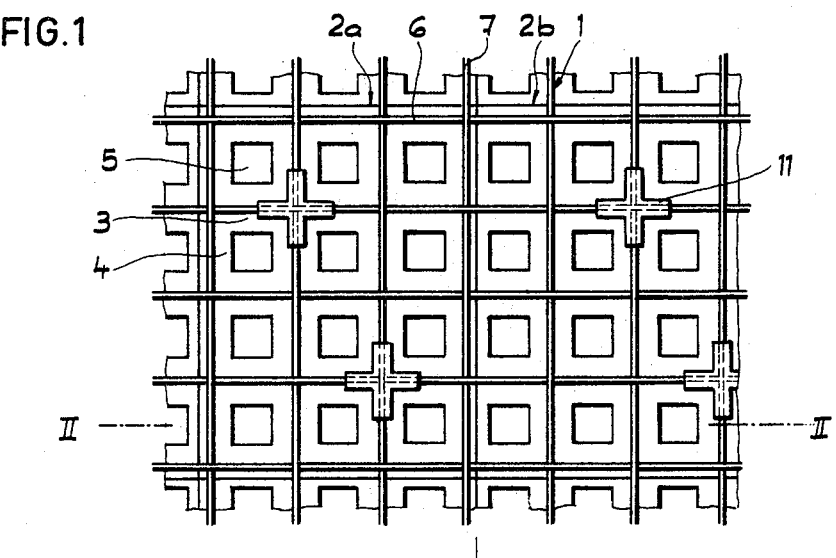
FIG. 1 is a bottom plan view of a section of a sieve bottom according to the invention.

In FIG. 1, which illustrates a partial bottom plan of a sieve bottom according to the invention, 1 generally designates a wire or rope reinforcing mesh and 2a and 2b generally designate sieve bottom sections made of rubber or plastics arranged multi-ply in juxta-position and sub-position, which complement the reinforcing mesh 1 to form an elastic sieve bottom.

Each sieve bottom section consists, in the example illustrated, of longitudinal and transverse bars 3 and 4 oriented at right angles to each other, which delimit sieve apertures which may be e.g., rectangular or square, but possibly also of a different shape e.g., circular. Whereas in the example illustrated, one sieve aperture 5 is present between each mesh formed by the longitudinal and transverse wires or ropes 6 and 7, obviously, depending upon the type of sieve to be constructed, a plurality of sieve apertures may also be present between each mesh, or respectively the parts between certain meshes at regular intervals may consist entirely of solid material — i.e., not contain a sieve aperture or sieve apertures.

On the side 8 of the sieve bottom sections which is remote from the charging side, grooves 9 are provided which receive the wires or ropes 6, 7 forming the reinforcing mesh when the sieve bottom sections 2a, 2b, etc. are pressed onto the reinforcing mesh in the direction of the arrow.

The grooves in the sieve bottom sections 2 which receive the ropes 6, 7 are conveniently so shaped that accidental detachment of the sections from the reinforcing mesh in service is prevented. For this purpose the grooves may, for example, have an inside width which is smaller than the diameter of the wires or ropes.

Figure 3:
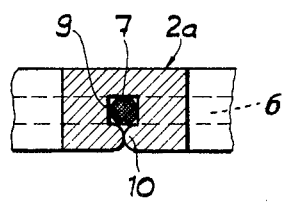
FIG. 3 shows a detail of the section III of FIG. 2.

Another possibility consists in constructing them according to FIG. 3. In this embodiment the grooves 9 are sealed on the aperture side by beads 10, which are urged aside when the sieve bottom sections are pressed onto the reinforcing fabric, so that the wires or ropes of the reinforcing fabric catch or snap in to some extent. The beads 10 need not be continuous from one edge to the other of a section, but in many cases it will be sufficient if they are provided at an interval from one another, conveniently regularly distributed.

As FIG. 1 shows, it is also possible where needed for security to provide patches 11 preventing detachment of the sieve bottom sections, and e.g., cross-shaped — to be vulcanized, adhered or welded on in manner known per se to the underside of the sieve bottom sections, conveninetly at intersections of the wires 6, 7. In other words patches 11 cover the grooves at various intersections to prevent the reinforcing elements 6, 7 from being dislodged from the individual plate shaped sieve sections.

Figure 2:
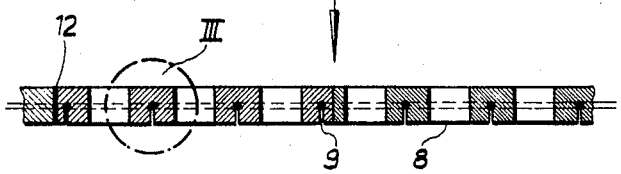
FIG. 2 is a section through FIG. 1 along the line II—II.

FIG. 2 shows how the sieve bottom sections may be equipped at their narrow outer surfaces or also only on two adjacent or opposite outer surfaces in each case with a cold vulcanizing connecting layer 12, so as to connect the sieve bottom constructed of individual sieve bottom sections 2a, 2b, or parts thereof, to form an integral whole.

The grooves 9 to accommodate the ropes or wires of the reinforcing mesh may also be provided in larger number than illustrated in FIGS. 1 and 2, i.e., in larger number and/or different arrangement than is necessary for a specific reinforcing mesh in each case, so that the sieve bottom sections 2a, 2b are suitable for the construction of sieve bottoms with reinforcing meshes of different mesh widths or wire arrangement.

The fixing of sieve bottoms constructed according to the invention may be performed by means of the wires or ropes 6, 7 protruding beyond the outermost sieve bottom sections in manner known per se between clamping edges. Since sieve bottom sections according to the invention can also be divided or trimmed to a suitable size in simple manner, a sieve of any desired dimensions can be constructed simply, likewise in the case of repairs the part to be repaired can be renewed in a very simple manner by lifting out the sieve bottom section which exhibits the damage and exchanging it for a new bottom section.

What is claimed is:

1. In an elastic sieve bottom comprising a plurality of abutting sieve sections, each of said sieve sections being plate shaped with a flat uncovered upper charging side for receiving fragmented material and a flat lower bottom side, each of said sections being of an elastic material and being provided with spaced sieve apertures to sift the fragmented material, a plurality of said sections cooperating together to comprise the active elements of the sieve, said flat lower bottom sides of said sections being provided with grooves between said apertures, each groove extending completely across its section and being aligned with a corresponding groove in its abutting section, reinforcing means in said aligned grooves whereby said sections are mounted on said reinforcing means and prevented from shifting out of abutting relationship with respect to each other, and the walls of each groove extending below said reinforcing means.

2. An elastic sieve bottom as set forth in claim 1 wherein each of said sections has integral lips over said grooves extending toward each other to confine said reinforcing means therein.

3. A sieve bottom as set forth in claim 1 including sealing means for closing said grooves on the side of said sections remote from the charging side of the sieve.

4. A sieve bottom as set forth in claim 3 wherein said sealing means are lips integral with its section and closing its respective groove, and said lips being laterally displaceable when placed on said reinforcing element to permit said element to enter its respective groove by spreading and thereafter closing said lips.

5. An elastic sieve bottom as set forth in claim 1 wherein said grooves includes a first groove in each section extending completely thereacross and a second groove in each section extending completely thereacross and intersecting said first groove, each first groove of each section being aligned with a respective first groove in an abutting section and each second groove in each section being aligned with a respective second groove in an abutting section, said reinforcing element being of mesh construction with a plurality of first wires and a plurality of second wires intersecting said first wires, each of said first wires being disposed in said aligned first grooves, and each of said second wires being disposed in said aligned second grooves.

6. An elastic sieve bottom as set forth in claim 5 including security patches attached to at least some of the intersections of the grooves on the bottom side of said sections remote from the charging side of the sieve.

* * * * *